US005384718A

United States Patent [19]

Oishi et al.

[11] Patent Number: 5,384,718

[45] Date of Patent: Jan. 24, 1995

[54] SET PARAMETER MEMORY MEANS AND TIME RECORDER

[75] Inventors: Katsumi Oishi; Masahisa Takano, both of Tokyo, Japan

[73] Assignee: Seikosha Co., Ltd., Tokyo, Japan

[21] Appl. No.: 865,600

[22] Filed: Apr. 9, 1992

[30] Foreign Application Priority Data

Apr. 11, 1991 [JP] Japan .................................. 3-079139

[51] Int. Cl.[6] .............................................. G06F 15/20

[52] U.S. Cl. ............................... 364/569; 364/464.04; 364/483

[58] Field of Search ............... 364/483, 368, 346, 550, 364/483, 464.04; 395/425

[56] References Cited

U.S. PATENT DOCUMENTS

| | | | |
|---|---|---|---|
| 4,400,783 | 8/1983 | Locke, Jr. et al. | 364/483 |
| 4,542,469 | 9/1985 | Brandyberry et al. | 364/483 |
| 4,692,874 | 9/1987 | Mihara | 364/483 |

*Primary Examiner*—Emanuel T. Voeltz
*Assistant Examiner*—Kamini Shah
*Attorney, Agent, or Firm*—Jordan and Hamburg

[57] ABSTRACT

A set parameter memory and a time recorder enable parameter setting to be readily effected in compliance with an individual user's demand. The set parameter memory has a memory circuit for storing set parameters for time supervision, and a terminal unit for transmission and/or reception of the set parameters. A time recorder has a connector unit which enables a terminal unit of a set parameter memory to be detachably connected thereto, a second memory circuit for storing set parameters, and a control circuit for writing set parameters stored in the set parameter memory to the second memory circuit. The time recorder may also be constructed with a connector unit which enables a terminal unit of a set parameter memory to be detachably connected thereto, a second memory circuit for storing set parameters, an operation unit for setting transmission and/or reception of set parameters, and a control circuit that effects control such that, when transmission and/or reception of the set parameters is set at the operation unit, the control circuit allows transfer of the set parameters between the set parameter memory and the second memory circuit, and upon completion of the transmission and/or reception of the set parameters, the control circuit inhibits the transfer of the set parameters between the set parameter memory and the second memory circuit.

12 Claims, 2 Drawing Sheets

SET PARAMETER MEMORY MEANS AND TIME RECORDER

BACKGROUND OF THE INVENTION

The present invention relates to a set parameter memory means and a time recorder.

In conventional time recorders, various kinds of parameters, e.g., opening hour, closing hour, etc., are set by a keying operation or the like conducted by each individual user because these parameters vary according to the user.

Recently, duty service patterns at offices have been diversified due to the introduction of flextime, for example, and therefore a large number of parameters have been needed. As a result, the parameter setting method has become complicated, and it is in many cases difficult for users to effect parameter setting.

SUMMARY OF THE INVENTION

It is an object of the present invention to provide a set parameter memory means and a time recorder which enable parameter setting to be readily effected in compliance with each individual user's demand.

In accordance with the present invention, a set parameter memory means comprises a memory circuit for storing set parameters for time supervision, and a terminal unit for transmission and/or reception of the set parameters.

Further, in accordance with the present invention, a time recorder comprises a connector unit which enables a terminal unit of a set parameter memory means to be detachably connected thereto, a second memory circuit for storing set parameters, and a control circuit for writing set parameters stored in the set parameter memory means in the second memory circuit.

The present invention also provides a time recorder comprising a connector unit which enables a terminal unit of a set parameter memory means to be detachably connected thereto, a second memory circuit for storing set parameters, an operation unit for setting transmission and/or reception of set parameters, and a control circuit that effects control such that, when transmission and/or reception of the set parameters is set at the operation unit, the control circuit allows transfer of the set parameters between the set parameter memory means and the second memory circuit, and upon completion of the transmission and/or reception of the set parameters, the control circuit inhibits the transfer of the set parameters between the set parameter memory means and the second memory circuit.

BRIEF DESCRIPTION OF THE DRAWINGS

The present invention will be better understood when described in conjunction with the accompanying drawings, in which.

DESCRIPTION OF THE PREFERRED EMBODIMENTS

An embodiment of the present invention will now be described with reference to the drawings.

Figure 1:
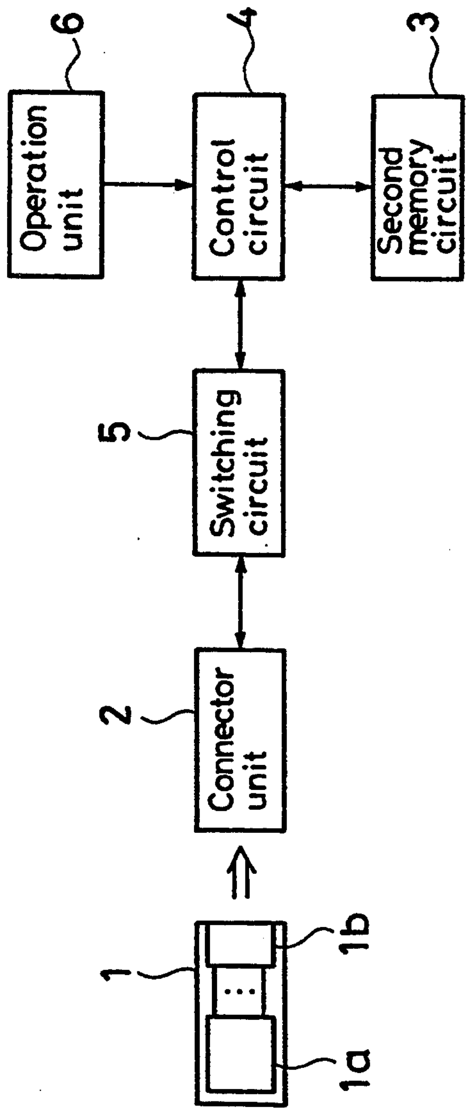
FIG. 1 is a block diagram illustrating one embodiment of the present invention.

Referring to FIG. 1, a set parameter memory means 1 has a memory circuit 1*a* for storing set parameters, for example, opening hour and other necessary parameters, and a terminal unit 1*b* for transmission and reception of the set parameters. The memory circuit 1*a* comprises an $E^2$ROM, for example, which has previously been loaded with the following set parameters for time supervision by the manufacturer in accordance with duty service patterns at each particular office or the like in which the system is employed:

(1) time table information representative of office hours, e.g., opening hour, closing hour, etc.;

(2) information concerning print positions, e.g., closing day, line feed time, and print column designation; and (3) information concerning a method for calculating overtime hours.

The system includes a connector unit 2 for connecting the terminal unit 1*b*, a second memory circuit 3 for storing set parameters, e.g., opening hour and other necessary parameters, a control circuit 4 that controls transmission and reception of the set parameters and a time supervising operation, a switching circuits that controls electrical connection between the connector unit 2 and the control circuit 4, and an operation unit 6 comprising a plurality of keys for effecting transmission and reception of the set parameters and setting parameters, e.g., opening hour and other necessary parameters. These elements constitute in combination a time recorder.

Figure 2:
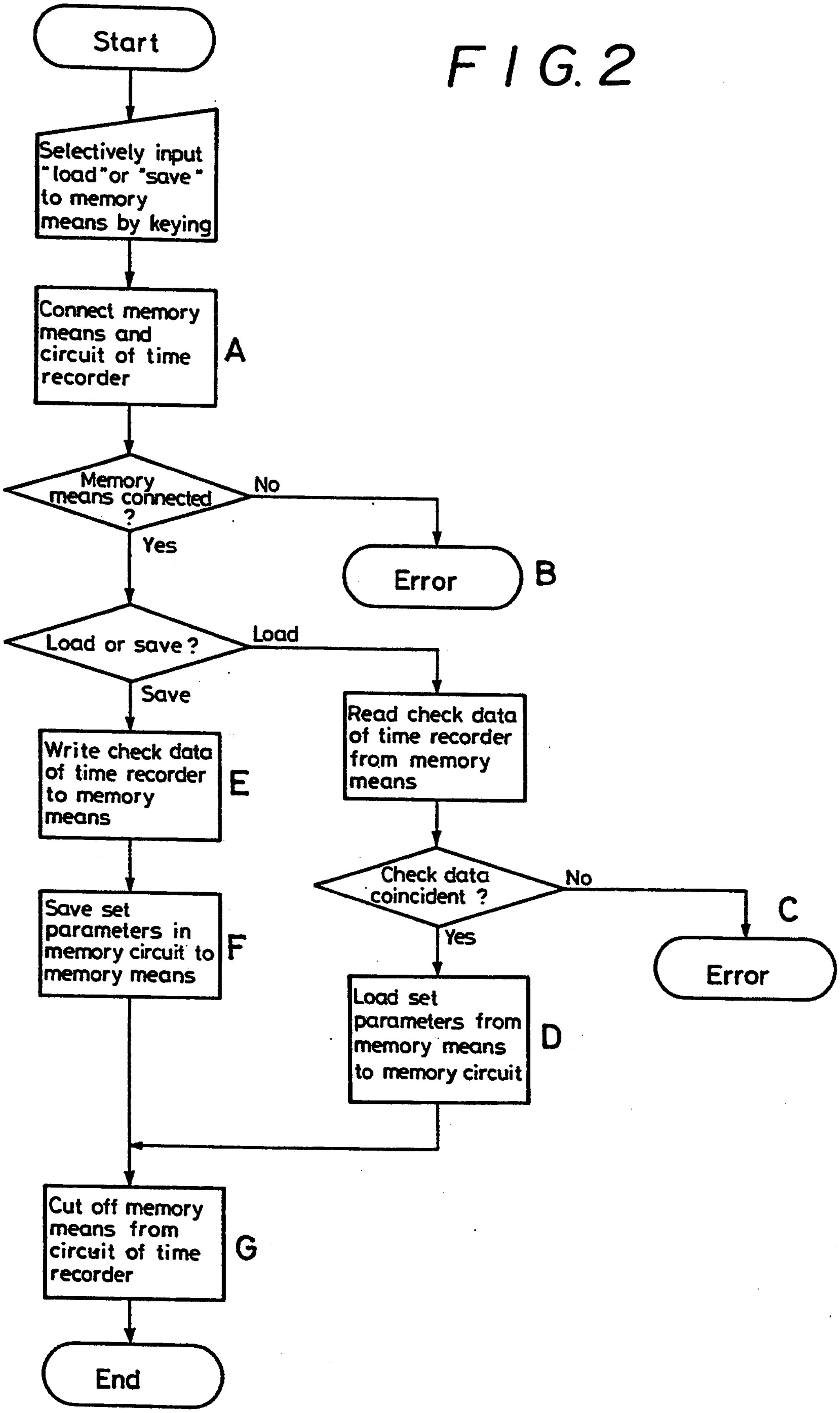
FIG. 2 is a flow chart of the operation of the embodiment shown in FIG. 1.

An operation of transmission and reception of set parameters between the set parameter memory means 1 and the second memory circuit 3 will now be explained with reference to the flow chart of FIG. 2. First, initiation of "load" or "save" of set parameters is designated by actuating the operation unit 6. In response to this designation, the control circuit 4 activates the switching circuit 5 to interconnect the connector unit 2 and the control circuit 4 (Step A).

Subsequently, the control circuit 4 judges whether or not the terminal unit 1*b* of the set parameter memory means 1 is connected to the connector unit 2. If the terminal unit 1*b* is not connected to the connector unit 2, a predetermined error alarm is given (Step B).

On the other hand, if it is confirmed that the terminal unit 1*b* is connected to the connector unit 2, an operation is executed in accordance with "load" or "save" designated through the operation unit 6.

If "load" is designated, the control circuit 4 first reads out check data for judging whether or not the set parameters in the memory circuit 1*a* are to be used for this time recorder and then compares it with check data stored in advance in the second memory circuit 3. The check data represents the name of the model of time recorder for which the set parameters may be used, the version number, etc., and it is stored in the memory circuit 1*a*. If the two pieces of check data disagree with one another, a predetermined error alarm is given (Step C). If the pieces of check data are coincident with one another, on the other hand, the set parameters in the memory circuit 1*a* are read out and loaded into the second memory circuit 3 (Step D).

Thus, it is possible for the user to set various kinds of parameters simply by attaching the set parameter memory means 1 to the time recorder and actuating the keys for loading. Accordingly, a complicated keying operation is not needed, and thus extremely great advantages are provided in practical use.

In factories, offices, etc., a large number of time recorders of the same type are used, and it is therefore necessary to set common parameters in each of the time recorders. In such a case, it is only necessary to set the parameters in the time recorders successively with a single memory means in the manner described above. However, duty service patterns, e.g., opening hour, closing hour, etc., are often changed. In such a case, the parameters in the second memory circuit 3 of each time recorder may be changed by a method that has heretofore been used. However, it is considerably troublesome to execute a change of a parameter for all the time recorders by repeating the same keying operation. Therefore, in such a case, the change of a parameter is executed by a keying operation for the second memory circuit 3 of only one time recorder, and the changed parameters are saved to the memory means 1. In this way, for the other time recorders, change of a parameter can be readily executed simply by loading the parameters in the memory means 1 to the time recorders by the procedure described above.

To execute a "save" operation, "save" is designated through the operation unit 6. As a result, the procedure shown in the flow chart of FIG. 2 is executed. More specifically, the check data stored in the second memory circuit 3 is read out and written to the memory circuit 1*a* at Step E, and then the set parameters in the second memory circuit 3 are saved to the memory circuit 1*a* (Step F).

Upon completion of the operation at Step D or Step F for the "load" or "save" operation, the control circuit 4 activates the switching circuit 5 to cut off the connector unit 2 from the control circuit 4 (Step G). In other words, the connector unit 2 and the control circuit 4 are connected to one another only when the data "load" or "save" operation is executed.

By the above-described operation, transmission and reception of parameters are performed between the memory circuit 1*a* and the second memory circuit 3. That is, in a "load" process, the parameters stored in the memory circuit 1*a* are copied to the second memory circuit 3, and the time recorder operates on the basis of these parameters. In a "save" process, the parameters stored in the second memory circuit 3 are copied to the memory circuit 1*a*, and these parameters can be set in other time recorders.

According to the present invention, set parameters are stored in a detachable set parameter memory means in advance, so that the parameters can be readily set in a plurality of time recorders using the set parameter memory means. In addition, if parameters that are set to a specific time recorder are copied in the set parameter memory means, it is possible to readily set the same parameters in other time recorders.

Although the present invention has been fully described by way of example with reference to the accompanying drawings, it is to be understood that various changes and modifications will be apparent to those skilled in the art. Therefore, unless such changes and modifications depart from the scope of the invention, they should be construed as being included therein.

We claim:

1. A time recorder for use with a portable setting parameter memory means having first memory circuit means for storing first. Setting parameters for time supervision, terminal unit means for transmission and reception of said setting parameters and a terminal, said time recorder comprising:

connector unit means for detachably connecting said time recorder to said terminal of said portable setting parameter memory means;

second memory circuit means for storing second setting parameters;

operation means for:

selectively designating transmission and reception of said first and second setting parameters between said first memory circuit and said second memory circuit, and changing said second setting parameters stored in said second memory circuit means independently of said portable setting parameter memory means; and control circuit means for selectively controlling transfer of said first and second setting parameters such that, when transmission or reception of said first or second setting parameters is designated by said operation means, said control circuit means allows transfer of said first setting parameters from said portable setting parameter memory means to said second memory circuit means, and said second setting parameters from said second memory circuit means to said portable setting parameter memory means, and upon completion of the transmission or reception of said first or second setting parameters, said control circuit means inhibits the transfer of said first or second setting parameters between said portable setting parameter memory means and said second memory circuit means, said control circuit means being connected to said connector unit means, said operation means and said second memory circuit means.

2. A time recorder according to claim 1, wherein said connector unit means is connected between said portable setting parameter memory means and said control circuit means, and said second memory circuit means and said operation means are connected to said control circuit means.

3. A time recorder according to claim 2, further including switching means electrically connected between said connector unit means and said control circuit means.

4. A time recorder according to claim 1, wherein said first memory circuit means includes an $E^2ROM$.

5. A time recorder for use with portable setting parameter memory means having first memory circuit means for storing first setting parameters for time supervision and first data representative of the type of time recorder corresponding to said first setting parameters to be used, terminal unit means for transmission and reception of said first setting parameters and a terminal, said time recorder comprising:

connector unit means for detachably connecting said time recorder to said terminal of said portable setting parameter memory means;

second memory circuit means for storing second setting parameters and second data representative of the type of a time recorder which includes said second memory circuit means;

operation means for:

selectively designating transmission and reception of said first and second setting parameters, and changing said second setting parameters stored in said second memory circuit means independently of said portable setting parameter memory means; and control circuit means for comparing said first data and said second data and for selectively controlling transfer of said first and setting parameters such that, when transmission or reception of said first or second setting parameters is designated by said operation means, said control circuit means allows transfer of said first setting parameters from said portable setting parameter memory means to said second memory circuit means, and said second setting parameters from said second memory circuit means to said portable setting parameter memory means, when said first data and said second data coincide, and upon completion of the transmission or reception of said first or second setting parameters, said control circuit means inhibits the transfer of said first or second setting parameters between said portable setting parameter memory means and said second memory circuit means, said control circuit means being connected to said connector unit means, said operation means and said second memory circuit means.

6. A time recorder according to claim 5, wherein said connector unit means is connected between said portable setting parameter memory means and said control circuit means, and said second memory circuit means and said operation means are connected to said control circuit means.

7. A time recorder according to claim 6, further including switching means electrically connected between said connector unit means and said control circuit means.

8. A time recorder according to claim 5, wherein said first memory circuit means includes an $E^2ROM$.

9. A time recording apparatus comprising:

portable setting parameter memory means consisting essentially of:

first memory circuit means for storing first setting parameters for time supervision, terminal unit means for transmission and reception of said first setting parameters, and a terminal; and a time recorder including:

connector unit means for detachably connecting said time recorder to said terminal of said portable setting parameter memory means, second memory circuit means for storing second setting parameters, operation means for selectively designating transmission and reception of said first and second setting parameters, and changing said second setting parameters stored in said second memory circuit means independently of said portable setting/parameter memory means, and control circuit means for selectively controlling transfer of said first or second setting parameters such that, when transmission or reception of said first or second setting parameters is designated by said operation means, said control circuit means allows transfer of said first setting parameters from said portable setting parameter memory means to said second memory circuit means, and said second setting parameters from said second memory circuit means to said portable setting parameter memory means, and upon completion of the transmission or reception of said first or second setting parameters, said control circuit means inhibits the transfer of said first or second setting parameters between said portable setting parameter memory means and said second memory circuit means, said control circuit means being connected to said connector unit means, said operation means and said second memory circuit means.

10. A time recorder according to claim 9, wherein said connector unit means is connected between said portable setting parameter memory means and said control circuit means, and said second memory circuit means and said operation means are connected to said control circuit means.

11. A time recorder according to claim 10, further including switching means electrically connected between said connector unit means and said control circuit means.

12. A time recorder according to claim 9, wherein said first memory circuit means includes an $E^2ROM$.

* * * * *